June 28, 1938.   J. W. CULBERTSON   2,122,026
SHOCK ABSORBER FOR DRIFT RECORDING INSTRUMENTS
Original Filed April 3, 1935   2 Sheets-Sheet 2
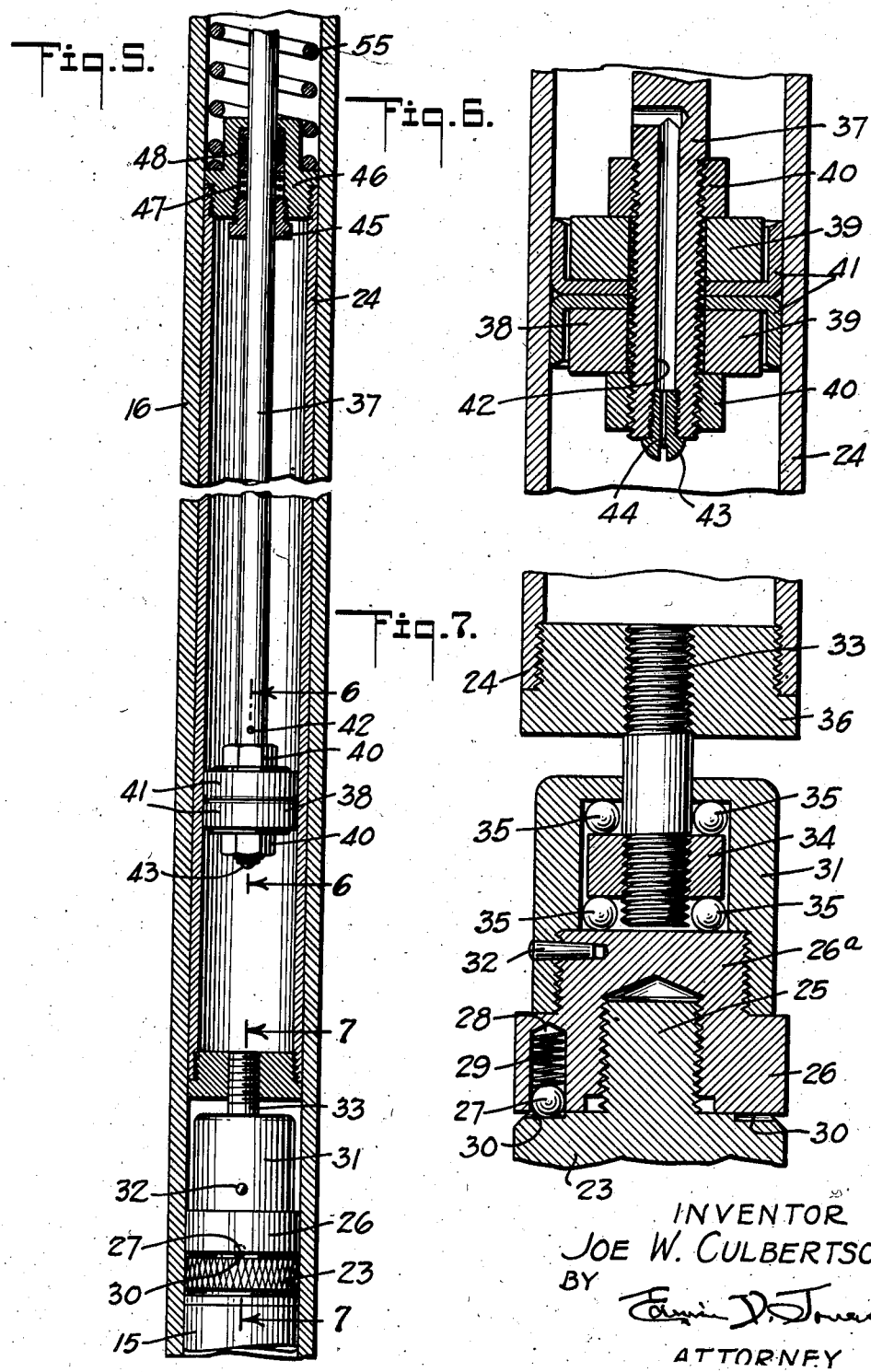
INVENTOR
JOE W. CULBERTSON
BY
ATTORNEY Patented June 28, 1938

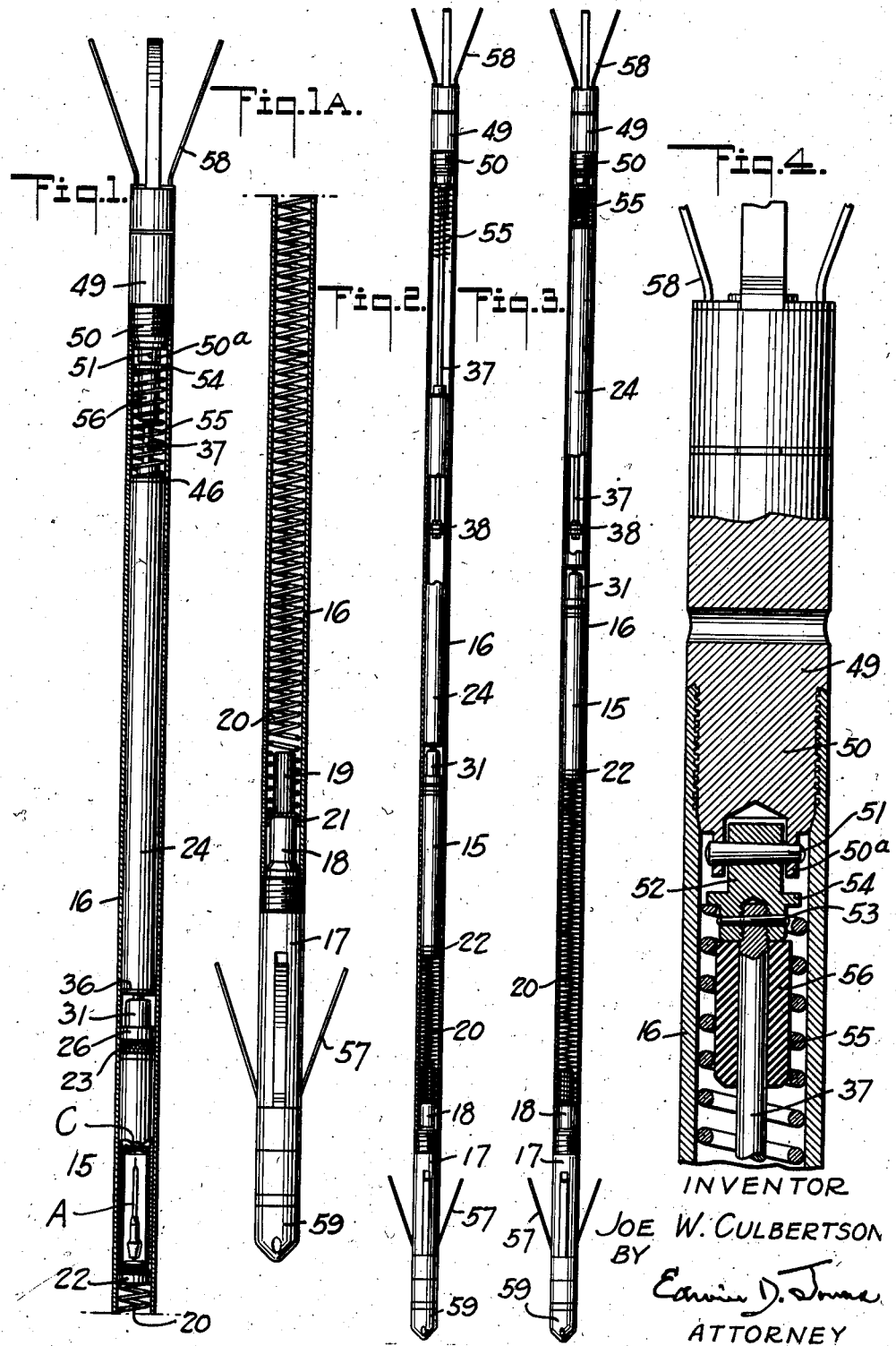

2,122,026

UNITED STATES PATENT OFFICE 2,122,026

SHOCK ABSORBER FOR DRIFT RECORDING INSTRUMENTS

Joe W. Culbertson, West Hollywood, Calif., assignor to Technical Oil Tool Corporation, Ltd., a corporation of California Original application April 3, 1935, Serial No. 14,479. Divided and this application October 23, 1936, Serial No. 107,217

11 Claims. (Cl. 33—205.5)

My invention relates to shock absorbers for drift recording instruments and is a division of my co-pending application for drift recording apparatus, Ser. No. 14,479, filed April 3, 1935.

It is a purpose of my present invention to provide a shock absorber by which any drift recording instrument, and particularly one of the delicate character embodied in my co-pending application above referred to, is effectively protected against damage resultant of the forces of impact produced by the instrument housing striking the wall projections of an open hole or drill pipe during descent and the final impingement thereof at the point of stoppage, whether the instrument is dropped or lowered into an open hole or drill pipe.

It is also a purpose of my invention to provide a shock absorber of the character above described which is particularly adapted for use in conjunction with any drift recording instrument employing a plumb bob type of angle marker, and where it is necessary to secure an accurate drift recordation in the shortest time possible. A factor necessary to secure quick and accurate recordation is that the free swinging angle marker be brought quickly to a complete standstill after the instrument reaches its limit of descent in a well. By means of my shock absorber the instrument is not only effectively protected against damage, but such bodily movements as the angle marker is subjected incident to my device absorbing shocks, are quickly dampened to bring the angle marker as a whole rapidly to a standstill.

I will describe only one form of shock absorber for drift recording instruments embodying my invention and will then point out the novel features thereof in claims.

In the accompanying drawings:

Figs. 1 and 1ᵃ are figures, one a continuation of the other, showing in side elevation with the housing thereof in section, one form of shock absorber embodying my invention in association with a drift recording instrument.

Figs. 2 and 3 are figures showing the shock absorber partly in elevation and partly in section, and two positions which the parts thereof are adapted to occupy when in actual use.

Fig. 4 is an enlarged fragmentary view showing in longitudinal section the upper portion of a shock absorber.

Fig. 5 is a view similar to Fig. 2 and is a continuation thereof.

Figs. 6 and 7 are enlarged fragmentary sectional views taken on the lines 6—6 and 7—7 of Fig. 5.

My invention in the embodiment herein shown comprises a receptacle 15 adapted to contain an instrument for recording the drift or deviation of a well hole from the vertical, such as the instrument embodied in my co-pending application above referred to. This instrument includes a plumb bob type of angle marker A for marking the angle of deviation on a chart C when the latter is moved into engagement with the marker by a preset time controlled actuating mechanism (not shown).

The receptacle 15 is contained in an elongated tubular metal housing 16, the lower end of which is closed by a stem 17 threaded into housing and provided with extension 18. A rubber buffer block 19 reposes on the inner end of the extension 18 and projects into the lower end of a spring 20 for the purpose of preventing full compression of the spring and thus avoiding the resultant metal to metal contact of its convolutions and the consequent transmission of shock to the elements connected to and contacting with the spring. A leather cup 21 is secured to the lower end of the block 19, and it is of such diameter as to frictionally retain itself within the housing 16 to prevent the spring from dropping out of the housing when the extension 18 is removed.

The receptacle 15 is situated in the housing 16 above the spring 20, and its lower end is closed by a plug 22 against which bears the upper end of the spring. The upper end of the receptacle is closed by a cap 23 connected to the lower end of a cylinder 24 through a stud 25 (Fig. 7). Threaded upon the stud is a cup-shaped nut 26 and this nut is releasably locked against accidental unscrewing by a ball 27 in a pocket 28 and a spring 29 pressing the ball into any one of a plurality of radial grooves 30 in the confronting face of the cap 23. The nut 26 has a reduced portion 26ᵃ upon which a cap 31 is threaded and locked by a pin 32.

Extending into the cap 31 is a coupling pin 33 having a collar 34 threaded therein and rotatably mounted in the cap by means of balls 35. Thus, the coupling pin is rotatable relative to the cap and the elements connected thereto. The upper end of the coupling pin is threaded into a head 36 threaded, in turn, into and closing the lower end of the cylinder 24. The elements just described constitute a rotatable connection between the cylinder and the receptacle 15 which prevents unscrewing of the receptacle from the cylinder during application or removal of the latter.

Extending downwardly into the cylinder 24 is a rod 37 having on its lower end a piston 38 made up of a pair of rings 39 through which the rod extends. A pair of nuts 40 are threaded on the rod for securing the rings in clamping relation to a pair of reversely disposed cup washers 41 preferably made of leather.

The rod 37 is bored to form a duct 42 which functions to by-pass air from one side of the piston to another, and the amount of air so by-passed is controllable by a metering pin 43 threaded in the lower end of the rod and formed with a port 44. The diameter of this port determines the rate of air flow through the pin, and by substituting similar pins having ports of other diameters the rate of airflow can be metered as required.

As best shown in Fig. 5, the piston rod 37 extends upwardly through a stuffing box comprising a packing nut 45 and a gland 46 threaded in the cylinder 24 and receiving a spring 47 which is adjustable by the nut to compress packing 48 contained in the gland. The rod at its upper end is connected to an upper stem 49 formed of solid metal and threaded in the upper end of the housing 16 (Fig. 4) through the medium of reduced extension 50. This extension carries a collar 50ᵃ, and a pin 51 extends through the collar and through a head 52 to provide a pivotal connection between the two.

This pivotal connection allows that freedom of movement of the cylinder 24 necessary to permit self-alining thereof in the housing 16. The rod 37 is threaded in the lower end of the head 52 and secured by a pin 53, while the head is formed with a flange 54 against which the upper end of a spring 55 abuts. A buffer sleeve 56 formed of rubber surrounds the rod 37 contiguous to the head 52 to prevent complete retraction of the spring and the consequent metal to metal contact of the convolutions thereof.

Lower and upper sets of spring arms 57 and 58, respectively, are secured to the stems 17 and 49, respectively, for the purpose of centering the housing 16 when it comes to rest after being dropped or lowered in a drill pipe. A spear 59 is connected in any suitable manner to the lower end of the stem 17. As the spring arms and spear form no part of the present invention the manner in which they are connected to the stem is immaterial.

In the operation of the shock absorber, the parts thereof normally occupy the positions illustrated in Figs. 1 and 1ᵃ in which the receptacle 15 containing the drift recording instrument is resiliently sustained within the housing between the springs 20 and 55. When the housing is lowered or dropped into a drill pipe or open hole with the spear end lowermost, the spear strikes whatever wall or pipe projections are disposed in its path to, in each instance, momentarily check descent of the housing. With each checking movement inertia acts to cause the cylinder and the receptacle to move downwardly in the housing, as illustrated in Fig. 2.

As the piston is fixed against movement lengthwise in the cylinder such downward movement of the cylinder is resisted by the air above the piston. The resistance so offered is a yielding one to gradually decelerate movement of the cylinder in such manner as to prevent sudden and damaging movement of the parts of the drift recording instrument contained in the receptacle. This is attained by the air above the piston being compressed with each downward movement of the cylinder and allowed to bleed through the metering port 44 to the lower side of the piston at a predetermined rate depending upon the diameter of the port. The spring 20 likewise resists movement of the cylinder downward, but its primary purpose is to constantly act to restore the cylinder to its normal elevated position. Upward movement of the cylinder and receptacle as a result of expansion of the spring 20, is resisted by the spring 55 and the air below the piston to decelerate such movement in accordance with the bleeding of air to the upper side of the piston. The uppermost position of these elements is shown in Fig. 3.

Thus it becomes manifest that my shock absorber embodies a resilient means which are the springs 20 and 55, and a pneumatic or fluid means which comprises the cylinder and piston, the two means coacting to absorb each shock to which the housing is subjected during descension into a well, in a manner to prevent its transmission to the drift recording instrument to the extent of damaging the instrument.

Once the housing reaches its lowermost point of descent such as when the spear strikes the bottom of an open hole or the stem of a drill bit in a drill pipe, the whole housing is subjected to a blow the force of which causes rapid reciprocation of the cylinder and receptacle between the springs thereby subjecting the angle marker of the instrument to a like motion. As long as the angle marker is vibrating in this manner an accurate recordation cannot be made, hence, if time is the essence in making a recordation such as in rotary drilling, it is necessary that bodily movement of the angle marker be dampened as rapidly as possible. Through provision of the cylinder and piston acting as they do to yieldingly restrain movements of the receptacle in both directions, reciprocation of the receptacle is soon dampened to bring the angle marker quickly to a standstill following the blow to which the housing is subjected when reaching its limit of descent.

Depending upon the depth of the well in which a drift recordation is taken, which in turn determines the speed of descent of the housing and the resultant force with which it strikes the bottom of the well or the drill pipe, determines the size of the metering pin to be used in the piston. In other words, as the force of impact increases the diameter of the pin port used is decreased in order to decelerate bleeding of air from one side of the piston to the other. Naturally this increases the pressure to which the air in the cylinder is compressed by the piston and, hence, the resistance offered to movement of the cylinder and receptacle is increased accordingly.

Although I have herein shown and described only one form of shock absorber for drift recording instruments embodying my invention, it is to be understood that various changes and modifications may be made herein without departing from the spirit of my invention and the spirit and scope of the appended claims.

I claim:

1. In combination; a tubular housing closed at its ends; a receptacle movable axially in the housing; pneumatic means disposed in the housing between said receptacle and the upper end of the housing for cushioning the receptacle against axial shock in both directions; and resilient means in the housing between the lower end thereof and said pneumatic means for aiding the latter in cushioning the receptacle against shock when the latter is moved downwardly, and for returning the pneumatic means to a normal axial position in the housing.

2. In combination; an elongated tubular housing closed at its ends; a receptacle movable axially in the housing and adapted to contain a drift recording instrument; a double acting fluid shock absorber in the housing having a piston part and a cylinder part, one of said parts being secured to the housing and the other secured to the receptacle.

3. In combination; a tubular housing closed at its ends; a receptacle movable axially in the housing and adapted to contain a drift recording instrument; a double acting fluid shock absorber in the housing having a piston secured to one end of the housing; and a cylinder receiving the piston and secured to the receptacle.

4. In combination; an elongated tubular housing closed at its ends; a receptacle movable axially in said housing; a closed cylinder secured at its lower end to said receptacle and disposed in the housing above the receptacle; a piston in the cylinder secured to the upper end of the housing and having a duct therethrough to allow air to pass from one side of the piston to the other; and a spring in the housing beneath the receptacle for urging the cylinder and the receptacle upwardly to a predetermined axial position with respect to said piston.

5. In combination; an elongated tubular housing closed at its ends; a receptacle movable axially in said housing; a closed cylinder secured at its lower end to said receptacle and disposed in the housing above the receptacle; a piston in the cylinder secured to the upper end of the housing and having a duct therethrough to allow air to pass from one side of the piston to the other; and a second spring between the cylinder and the upper end of the housing.

6. In combination; a tubular housing closed at its ends; a receptacle movable axially in the housing and adapted to contain a drift recording instrument; a closed cylinder slidable in the housing above the receptacle; a rotatable connection between the cylinder and receptacle; a piston in the cylinder; a rod fixed to the piston and extending through the upper end of the cylinder; means for pivotally securing the rod to the upper end of the housing; a duct in the rod leading from one side of the piston to the other; a metering pin in the duct; and a spring between the receptacle and the lower end of the housing.

7. In combination; an elongated tubular housing closed at its ends; a receptacle movable axially in the housing and adapted to contain a drift recording instrument; a closed cylinder slidable in the housing above the receptacle and fixed to the receptacle; a piston in the cylinder; a rod fixed to the piston; extending through the upper end of the cylinder and secured to the upper end of the housing; a duct in the rod leading from one side of the piston to the other; a metering pin removably fitted in the duct; and a spring between the receptacle and the lower end of the housing.

8. In combination; an elongated tubular housing closed at its ends; a receptacle movable axially in the housing; a closed cylinder slidable in the housing above the receptacle; a rotatable connection between the cylinder and receptacle; a piston in the cylinder; a rod fixed to the piston and extending through the upper end of the cylinder; means for pivotally securing the rod to the upper end of the housing; a duct in the rod leading from one side of the piston to the other; a metering pin in the duct; and a second spring between the upper end of the cylinder and the upper end of the housing.

9. In combination; an elongated tubular housing closed at its ends; a receptacle movable axially in the housing and adapted to contain a drift recording instrument; a closed cylinder slidable in the housing above the receptacle; a rotatable connection between the cylinder and receptacle; a piston in the cylinder; a rod fixed to the piston and extending through the upper end of the cylinder; means for pivotally securing the rod to the upper end of the housing; a duct in the rod leading from one side of the piston to the other; a metering pin removably fitted in the duct; and buffer members of nonmetallic material correlated to the springs for preventing complete contraction of the springs.

10. In combination; a tubular housing closed at its ends; a drift recording instrument movable axially in the housing and including a plumb bob type of angle marker; resilient means in the housing at opposite ends of said instrument for cushioning said instrument against axial shock; and means in the housing for dampening axial vibrations of said instrument whereby the angle marker is quickly brought to a standstill following cessation in motion of the housing.

11. In combination; a tubular housing; a receptacle movable axially in the housing and adapted to contain a drift recording instrument; pneumatic means disposed in the housing between the receptacle and one end of the housing; and resilient means disposed in the housing between the receptacle and the other end of the housing, said pneumatic and resilient means being constructed and arranged to coact in cushioning the receptacle and the instrument therein against axial shock.

JOE W. CULBERTSON.